United States Patent
Yeh

(10) Patent No.: US 7,936,520 B2
(45) Date of Patent: May 3, 2011

(54) OPTICAL AXIS ORIENTATING DEVICE FOR LIQUID LENS

(75) Inventor: Jer-Liang Yeh, Taichung (TW)

(73) Assignee: National Tsing Hua University (TW)

( * ) Notice: Subject to any disclaimer, the term of this patent is extended or adjusted under 35 U.S.C. 154(b) by 122 days.

(21) Appl. No.: 12/108,913

(22) Filed: Apr. 24, 2008

(65) Prior Publication Data

US 2008/0266671 A1  Oct. 30, 2008

(30) Foreign Application Priority Data

Apr. 25, 2007 (TW) ............................. 96114560 A

(51) Int. Cl.
*G02B 1/06* (2006.01)

(52) U.S. Cl. ........................................ 359/666; 359/665

(58) Field of Classification Search ........... 359/665–667
See application file for complete search history.

(56) References Cited

U.S. PATENT DOCUMENTS

| | | | | |
|---|---|---|---|---|
| 7,561,340 B2* | 7/2009 | Tseng et al. | ................... | 359/665 |
| 7,605,984 B2* | 10/2009 | Yeh et al. | ........................ | 359/666 |
| 7,763,314 B2* | 7/2010 | Dai et al. | ....................... | 427/164 |
| 2006/0152814 A1* | 7/2006 | Peseux | ........................... | 359/665 |
| 2006/0193058 A1* | 8/2006 | Ootsuka et al. | ................ | 359/665 |
| 2007/0070509 A1 | 3/2007 | Yeh et al. | | |
| 2007/0127102 A1* | 6/2007 | Obinata | ........................ | 359/196 |
| 2009/0174948 A1* | 7/2009 | Kuiper et al. | ................. | 359/665 |
| 2010/0277742 A1* | 11/2010 | McMillan et al. | ............ | 356/450 |

FOREIGN PATENT DOCUMENTS

| | | |
|---|---|---|
| JP | 2002-540464 A | 11/2002 |
| JP | 2003-50303 A | 2/2003 |
| JP | 2006-178469 A | 7/2006 |
| JP | 2006-235476 A | 9/2006 |
| JP | 2007-25601 A | 2/2007 |
| JP | 2007-86786 A | 4/2007 |

* cited by examiner

*Primary Examiner* — Jordan M. Schwartz
(74) *Attorney, Agent, or Firm* — Thomas, Kayden, Horstemeyer & Risley, LLP.

(57) ABSTRACT

The invention provides an optical axis orientating device for a liquid lens. The optical axis orientating device includes a transparent substrate, a symmetric electrode structure, and an insulating layer. The electrode structure is capable of supplying an electric field and defines a central axis. The insulating layer provides an optical axis orientating structure symmetric with respect to the central axis. In particular, at a rest state, an optical axis of the liquid lens and the central axis of electrode are substantially coaxial.

16 Claims, 5 Drawing Sheets

OPTICAL AXIS ORIENTATING DEVICE FOR LIQUID LENS

BACKGROUND OF THE INVENTION

1. Field of the Invention

This invention is related to an optical axis orientating device and, more particularly, to an optical axis orientating device for a liquid lens.

2. Description of the Prior Art

Generally, a liquid lens refers to a focal length tuning lenses. In optical systems, focal length tuning lenses can be categorized into mechanical tuning lenses and electrical tuning lenses. As for mechanical tuning lenses, the tuning function is achieved by a motor which moves lenses forward or backward. However, due to the pursuit of miniaturization of digital cameras or mobile phones with an image-capturing function, mechanical tuning lenses are replaced with electrical tuning lenses in many light-and-thin cameras for the reason of thick lens and large volume.

In the prior art, an electrical tuning lens takes a droplet as a lens. The shape and curvature of the droplet can be controlled by use of an electrowetting mechanism to adjust the focal length of the droplet. However, if the droplet is not centered well, an optical axis of the droplet may be skew and cause the lens to focus inaccurately.

As shown in FIG. 1, one centering method is to dispose the droplet on the recess of the bell structure to prohibit the droplet from rolling. As shown in FIG. 2, another centering method is to dispose the droplet in a fluid chamber and then dispose another liquid to assist in centering the droplet. Because these two liquids are immiscible, a cambered interface in FIG. 2 is formed after the surface tension is balanced.

The drawbacks of the foregoing prior arts are a complicated manufacture process and high manufacture cost. Therefore, the invention provides an optical axis orientating device for a liquid lens to solve the above problems.

SUMMARY OF THE INVENTION

One scope of the invention is to provide an optical axis orientating device for a liquid lens. The liquid lens includes a sealing liquid and a lens liquid.

According to a preferred embodiment of the invention, the optical axis orientating device includes a transparent substrate, a symmetric electrode structure, and an insulating layer.

The transparent substrate has an upper surface. The symmetric electrode structure is formed on the upper surface of the substrate, capable of supplying an electric field and defining thereof a central axis. The insulating layer is formed on the upper surface of the substrate. Further, the insulating layer thereof provides an optical axis orientating structure symmetric with respect to the central axis of the electrode structure. The lens liquid is disposed on the optical axis orientating structure, and the sealing liquid is filled within the liquid lens. Thereby, at a rest state, an optical axis of the liquid lens and the central axis of the electrode structure are substantially coaxial.

According to another preferred embodiment of the invention, it is related to a liquid lens. The liquid lens includes a chamber, a transparent substrate, a symmetric electrode structure, an insulating layer, a lens liquid and a sealing liquid.

The chamber includes a transparent substrate having an upper surface inside the chamber. The symmetric electrode structure is formed on the upper surface of the substrate capable of supplying an electric field and defining thereof a central axis. The insulating layer is formed on the upper surface of the substrate. Further, the insulating layer thereof provides an optical axis orientating structure symmetric with respect to the central axis of the electrode structure. The lens liquid is disposed on the optical axis orientating structure, and the sealing liquid is filled within the chamber. Thereby, at a rest state, an optical axis of the liquid lens and the central axis of the electrode structure are substantially coaxial. In addition, a curvature of the lens liquid is capable of being adjusted by use of the electric field supplied by the electrode structure.

Compared to the prior art, the optical axis orientating device for the liquid lens according to the invention can orientate the optical axis of the liquid lens effectively. Because the framework and implementation of the optical axis orientating device and the liquid lens are simpler than those of the prior art, manufacture cost of related hardware can be reduced. Moreover, from the technical viewpoint, the optical axis orientating device according to the invention can be applied to liquid lenses based on other operation principles.

The advantage and spirit of the invention may be understood by the following recitations together with the appended drawings.

BRIEF DESCRIPTION OF THE APPENDED DRAWINGS

DETAILED DESCRIPTION OF THE INVENTION

Figure 1:
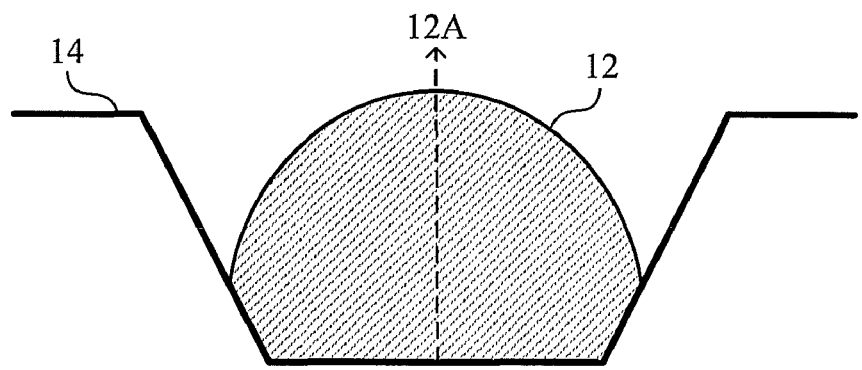
FIG. 1 and FIG. 2 illustrate the methods in the prior art for positioning a droplet, respectively.
Figure 2:
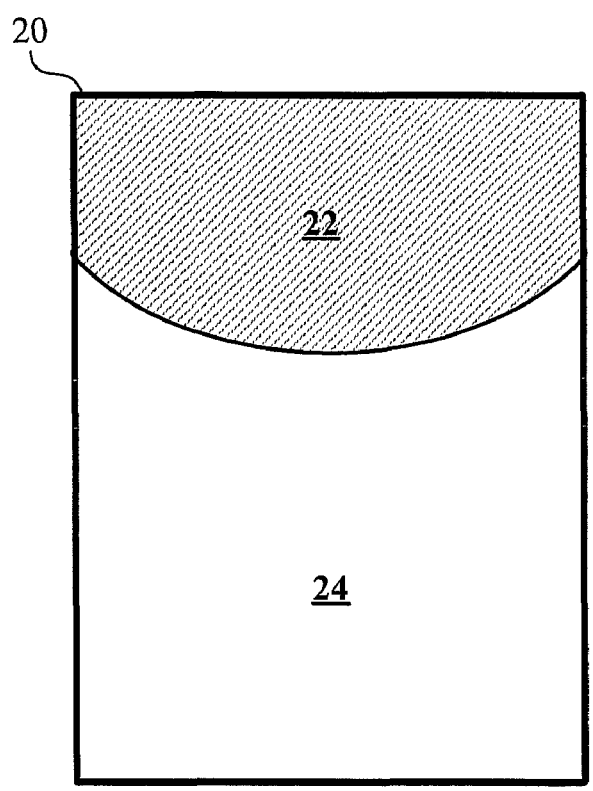
Figure 3:
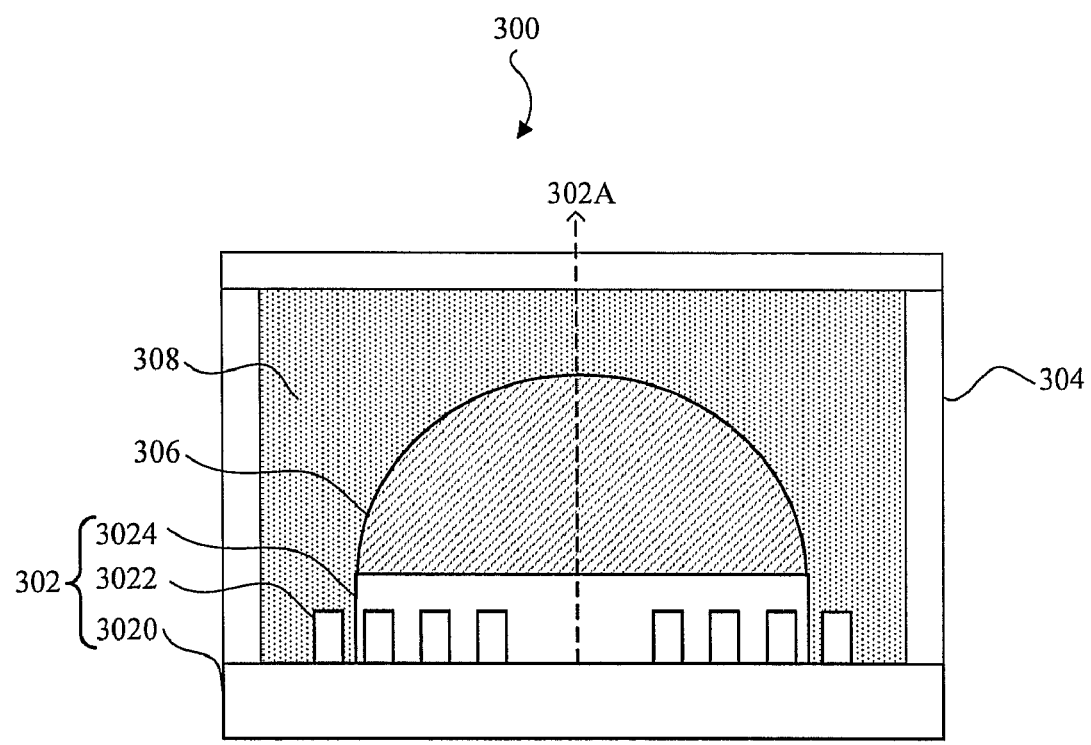
FIG. 3 is a schematic diagram of a liquid lens according to a preferred embodiment of the invention. The optical axis orientating structure in FIG. 3 is a platform.

Please refer to FIG. 3. FIG. 3 is a schematic diagram of an optical axis orientating device 302 for a liquid lens 300 according to a preferred embodiment of the invention. The liquid lens 300 includes a sealing liquid 308 and a lens liquid 306.

In one embodiment, the sealing liquid 308 and the lens liquid 306 can be immiscible and not electrically conductive. Besides, a density of the lens liquid 306 is substantially equal to that of the sealing liquid 308 to neglect the gravity between liquids and shape the liquid lens 300 successfully.

The sealing liquid 308 can be a first dielectric liquid, and the lens liquid 306 can be a second dielectric liquid. For example, the first dielectric liquid can be optical oil, and the second dielectric liquid can be a mixture of several polyhydric alcohols. Because the sealing liquid 308, i.e. the optical oil, has a greater refractive index, the liquid lens 300 with such combination can serve as a concave lens. Alternatively, the first dielectric liquid can be the mixture of several polyhydric alcohols, and the second dielectric liquid can be the optical oil. Because the sealing liquid 308, i.e. the mixture of several polyhydric alcohols, has a smaller refractive index, the liquid lens 300 with such combination can serve as a convex lens.

In another embodiment, either the sealing liquid 308 or the lens liquid 306 can be electrically conductive. Similarly, the sealing liquid 308 and the lens liquid 306 can be immiscible, and a density of the lens liquid 306 is substantially equal to that of the sealing liquid 308.

As shown in FIG. 3, the optical axis orientating device 302 includes a transparent substrate 3020, a symmetric electrode structure 3022, and an insulating layer 3024. In practical applications, the insulating layer 3024 can be transparent. The transparent substrate 3020 has an upper surface. The electrode structure 3022 is formed on the upper surface of the substrate 3020. The electrode structure 3022 is capable of supplying an electric field and defining thereof a central axis 302A. The insulating layer 3024 also takes the central axis 302A of the electrode structure 3022 as its central axis.

In one embodiment, the electrode structure 3022 can be formed in a form of a plurality of concentric circles.

The insulating layer 3024 is formed on the upper surface of the substrate 3020. Further, the insulating layer 3024 thereof provides an optical axis orientating structure symmetric with respect to the central axis 302A of the electrode structure 3022. In practical applications, the optical axis orientating structure can be a platform or a recess, and the morphology of the optical axis orientating structure can exhibit a circle or an ellipse.

Figure 4A:
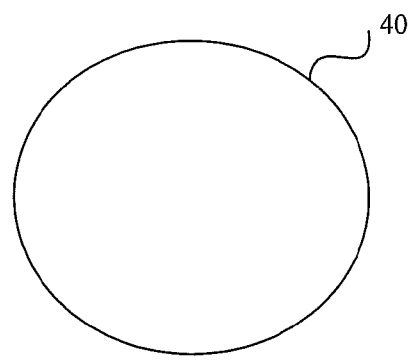
FIGS. 4A through 4D are the top views of possible optical axis orientating structures.
Figure 4B:
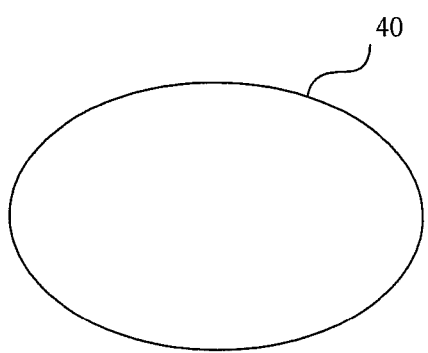
Figure 4C:
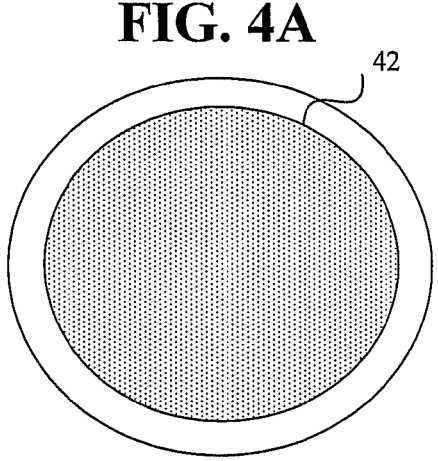
Figure 4D:
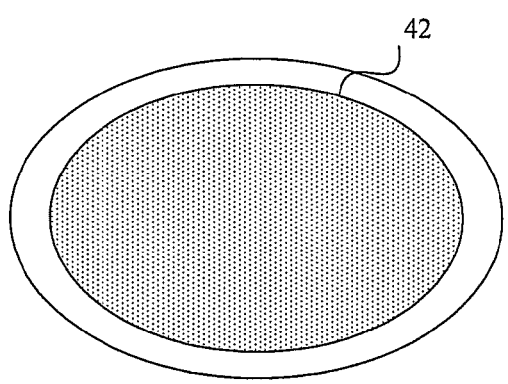

FIGS. 4A through 4D are the top views of possible optical axis orientating structures. As shown in FIG. 4A and FIG. 4B, the morphology of the platform 40 can exhibit a circle or an ellipse. As shown in FIG. 4C and FIG. 4D, the dotted area means the recess 42 whose morphology can also exhibit a circle or an ellipse.

The lens liquid 306 is disposed on the optical axis orientating structure, and the sealing liquid 308 is filled within the liquid lens 300. Thereby, at a rest state, an optical axis (not shown in the figure) of the liquid lens 300 and the central axis 302A of the electrode structure 3022 are substantially coaxial. In other words, the insulating layer 3024 has a specific pattern, i.e. the optical axis orientating structure, such that a shift angle or a displacement between the optical axis (not shown in the figure) of the liquid lens 300 and the central axis 302A of the electrode structure 3022 can be neglected.

Please refer to FIG. 3 again. FIG. 3 is a schematic diagram of a liquid lens 300 according to another preferred embodiment of the invention.

The liquid lens 300 includes a transparent substrate 3020, a symmetric electrode structure 3022, an insulating layer 3024, a chamber, a lens liquid 306 and a sealing liquid 308. The chamber includes a transparent substrate 3020 having an upper surface inside the chamber.

In one embodiment, the sealing liquid 308 and the lens liquid 306 can be immiscible and not electrically conductive. Besides, a density of the lens liquid 306 is substantially equal to that of the sealing liquid 308 to neglect the gravity between liquids and shape the liquid lens 300 successfully.

The sealing liquid 308 can be a first dielectric liquid, and the lens liquid 306 can be a second dielectric liquid. For example, the first dielectric liquid can be optical oil, and the second dielectric liquid can be a mixture of several polyhydric alcohols. Because the sealing liquid 308, i.e. the optical oil, has a greater refractive index, the liquid lens 300 with such combination can serve as a concave lens. Alternatively, the first dielectric liquid can be the mixture of several polyhydric alcohols, and the second dielectric liquid can be the optical oil. Because the sealing liquid 308, i.e. the mixture of several polyhydric alcohols, has a smaller refractive index, the liquid lens 300 with such combination can serve as a convex lens.

In another embodiment, either the sealing liquid 308 or the lens liquid 306 can be electrically conductive. Similarly, the sealing liquid 308 and the lens liquid 306 can be immiscible, and a density of the lens liquid 306 is substantially equal to that of the sealing liquid 308.

The electrode structure 3022 is formed on the upper surface of the substrate 3020. The electrode structure 3022 is capable of supplying an electric field and defining thereof a central axis 302A. The insulating layer 3024 also takes the central axis 302A of the electrode structure 3022 as its central axis.

In one embodiment, the electrode structure 3022 can be formed in a form of a plurality of concentric circles.

The insulating layer 3024 is formed on the upper surface of the substrate 3020. Further, the insulating layer 3024 thereof provides an optical axis orientating structure symmetric with respect to the central axis 302A of the electrode structure 3022. In practical applications, the optical axis orientating structure can be a platform or a recess, and the morphology of the optical axis orientating structure can exhibit a circle or an ellipse.

FIGS. 4A through 4D are the top views of possible optical axis orientating structures. As shown in FIG. 4A and FIG. 4B, the morphology of the platform 40 can exhibit a circle or an ellipse. As shown in FIG. 4C and FIG. 4D, the dotted area means the recess 42 whose morphology can also exhibit a circle or an ellipse.

The lens liquid 306 is disposed on the optical axis orientating structure, and the sealing liquid 308 is filled within the chamber. Thereby, at a rest state, an optical axis of the liquid lens 300 and the central axis 302A of the electrode structure 3022 are substantially coaxial. In addition, a curvature of the lens liquid 306 is capable of being adjusted by use of the electric field supplied by the electrode structure 3022. In other words, a contact angle of the lens liquid 306 can be adjusted to change the focus of the liquid lens 300.

Figure 5:
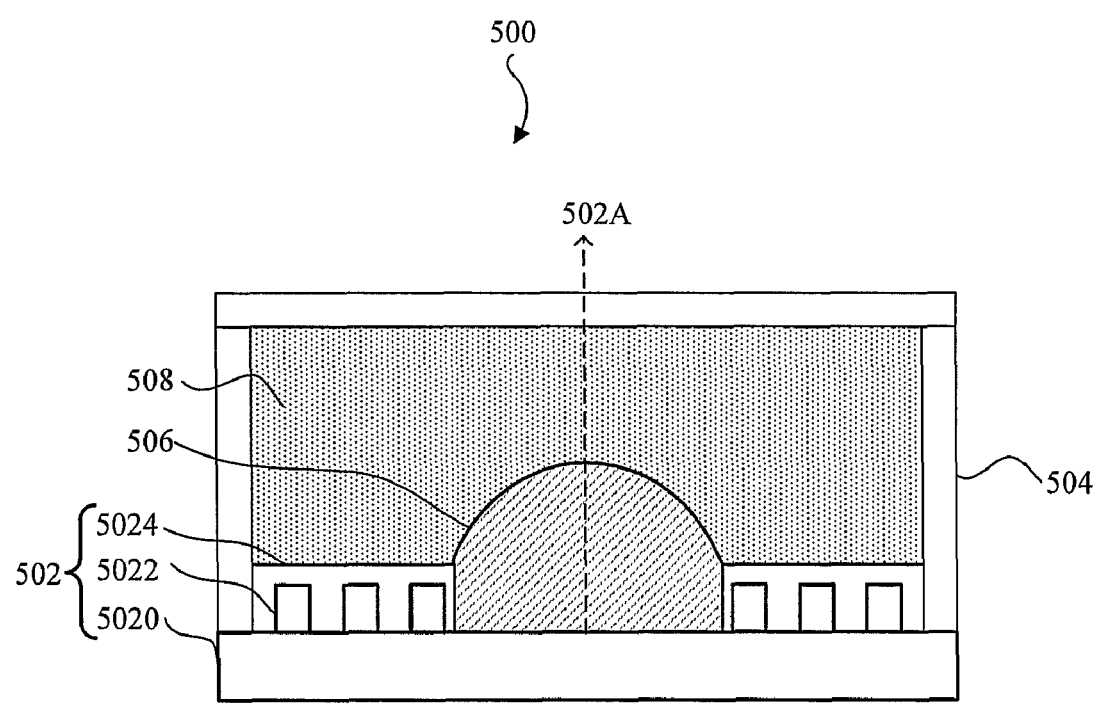
FIG. 5 is a schematic diagram of a liquid lens according to another preferred embodiment of the invention. The optical axis orientating structure in FIG. 5 is a recess.

FIG. 5 is a schematic diagram of a liquid lens 300 according to another preferred embodiment of the invention. FIG. 5 is substantially similar to FIG. 3 except that the optical axis orientating structure in FIG. 5 is a recess so that similar descriptions are not repeated therein.

Figure 6:
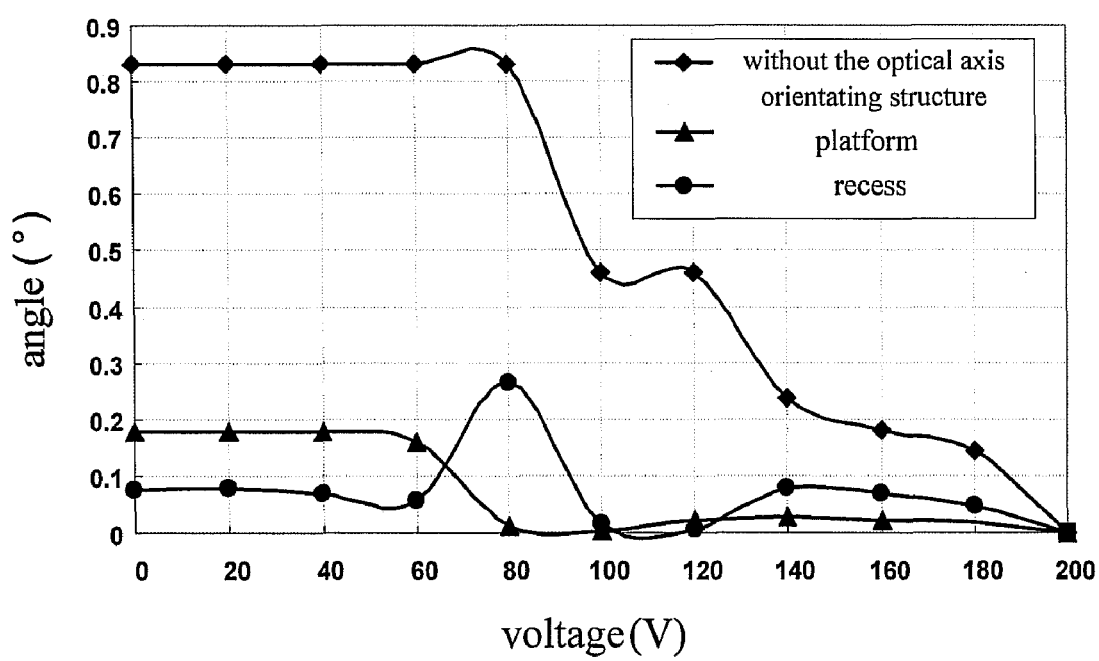
FIG. 6 is a graph from a shift angle test of the optical axis for the liquid lens according to the invention and a liquid lens without the optical axis orientating structure.

Please refer to FIG. 6. FIG. 6 is a graph from a shift angle test of the optical axis for the liquid lens according to the invention and a liquid lens without the optical axis orientating structure. The horizontal axis in the figure represents an external voltage applied to the electrode structure such that the electrode structure is capable of supplying an electric field. The vertical axis represents the shift angle of the optical axis of the liquid lens. The rhombus-marked curve represents the liquid lens without the optical axis orientating structure. The triangle-marked curve and the circle-marked curve represent an optical axis orientating structure with a circle platform and an optical axis orientating structure with a circle recess according to the invention, respectively. As shown in FIG. 6, within the supplied voltage range, the liquid lens according to the invention has a smaller shift angle. In particular, without the electric field supplied by the electrode structure, a shift angle or a displacement between the optical axis of the liquid lens and the central axis of the electrode structure according to the invention can be neglected. In other words, the optical axis of the liquid lens and the central axis of the electrode structure are substantially coaxial.

Compared to the prior art, the optical axis orientating device for the liquid lens according to the invention can orientate the optical axis of the liquid lens effectively. Because the framework and implementation of the optical axis orientating device and the liquid lens are simpler than those of the prior art, manufacture cost of related hardware can be reduced. Moreover, from the technical viewpoint, the optical axis orientating device according to the invention can be applied to liquid lenses based on other operation principles, e.g. a liquid lens utilizing the electrowetting mechanism.

With the example and explanations above, the features and spirits of the invention will be hopefully well described. Those skilled in the art will readily observe that numerous modifications and alterations of the device may be made while retaining the teaching of the invention. Accordingly, the above disclosure should be construed as limited only by the metes and bounds of the appended claims.

What is claimed is:

1. An optical axis orientating device for a liquid lens comprising a sealing liquid and a lens liquid, said optical axis orientating device comprising:
   a transparent substrate having an upper surface;
   a symmetric electrode structure formed on the upper surface of the substrate, capable of supplying an electric field, and defining thereof a central axis; and
   an insulating layer, formed on the upper surface of the substrate, the insulating layer thereof providing an optical axis orientating structure symmetric with respect to the central axis of the electrode structure, wherein the lens liquid is disposed on the optical axis orientating structure, the optical axis orientating structure being a platform having a step with an edge and covering a part of the upper surface of the substrate, and the sealing liquid is filled within said liquid lens, wherein the edge of the platform prevents the lens liquid from spreading out of the step onto the uncovered part of the upper surface of the substrate;
   whereby at a rest state, an optical axis of the liquid lens and the central axis of the electrode structure are substantially coaxial.

2. The optical axis orientating device of claim 1, wherein the shape of the optical axis orientating structure exhibits a circle or an ellipse.

3. The optical axis orientating device of claim 1 wherein the electrode structure is formed in a form of a plurality of concentric circles.

4. The optical axis orientating device of claim 1, wherein the sealing liquid and the lens liquid are immiscible and non-electrically conductive dielectrics, and a density of the lens liquid is substantially equal to that of the sealing liquid.

5. The optical axis orientating device of claim 4, wherein the sealing liquid is a first dielectric liquid, and the lens liquid is a second dielectric liquid.

6. The optical axis orientating device of claim 5, wherein the first dielectric liquid is optical oil, and the second dielectric liquid is a mixture of several polyhydric alcohols.

7. The optical axis orientating device of claim 5, wherein the first dielectric liquid is a mixture of several polyhydric alcohols, and the second dielectric liquid is optical oil.

8. The optical axis orientating device of claim 1, wherein the sealing liquid and the lens liquid are immiscible, a density of the lens liquid is substantially equal to that of the sealing liquid, and either the sealing liquid or the lens liquid is electrically conductive.

9. A liquid lens, comprising:
   a chamber comprising a transparent substrate having an upper surface inside the chamber;
   a symmetric electrode structure formed on the upper surface of the substrate, capable of supplying an electric field, and defining thereof a central axis;
   an insulating layer, formed on the upper surface of the substrate, the insulating layer thereof providing an optical axis orientating structure symmetric with respect to the central axis of the electrode structure, the optical axis orientating structure being a platform having a step with an edge and covering a part of the upper surface of the substrate;
   a lens liquid, disposed on the optical axis orientating structure, wherein the edge of the platform prevents the lens liquid from spreading out of the step onto the uncovered part of the upper surface of the substrate; and
   a sealing liquid, filled within the chamber;
   whereby at a rest state, an optical axis of the liquid lens and the central axis of the electrode structure are substantially coaxial, and a curvature of the lens liquid is capable of being adjusted by use of the electric field supplied by the electrode structure.

10. The liquid lens of claim 9, wherein the shape of the optical axis orientating structure exhibits a circle or an ellipse.

11. The liquid lens of claim 9, wherein the electrode structure is formed in a form of a plurality of concentric circles.

12. The liquid lens of claim 9, wherein the sealing liquid and the lens liquid are immiscible and non-electrically conductive dielectrics, and a density of the lens liquid is substantially equal to that of the sealing liquid.

13. The liquid lens of claim 12, wherein the sealing liquid is a first dielectric liquid, and the lens liquid is a second dielectric liquid.

14. The liquid lens of claim 13, wherein the first dielectric liquid is optical oil, and the, second dielectric liquid is a mixture of several polyhydric alcohols.

15. The liquid lens of claim 13, wherein the first dielectric liquid is a mixture of several polyhydric alcohols, and the second dielectric liquid is optical oil.

16. The liquid lens of claim 9, wherein the sealing liquid and the lens liquid are immiscible, a density of the lens liquid is substantially equal to that of the sealing liquid, and either the sealing liquid or the lens liquid is electrically conductive.

* * * * *